UNITED STATES PATENT OFFICE.

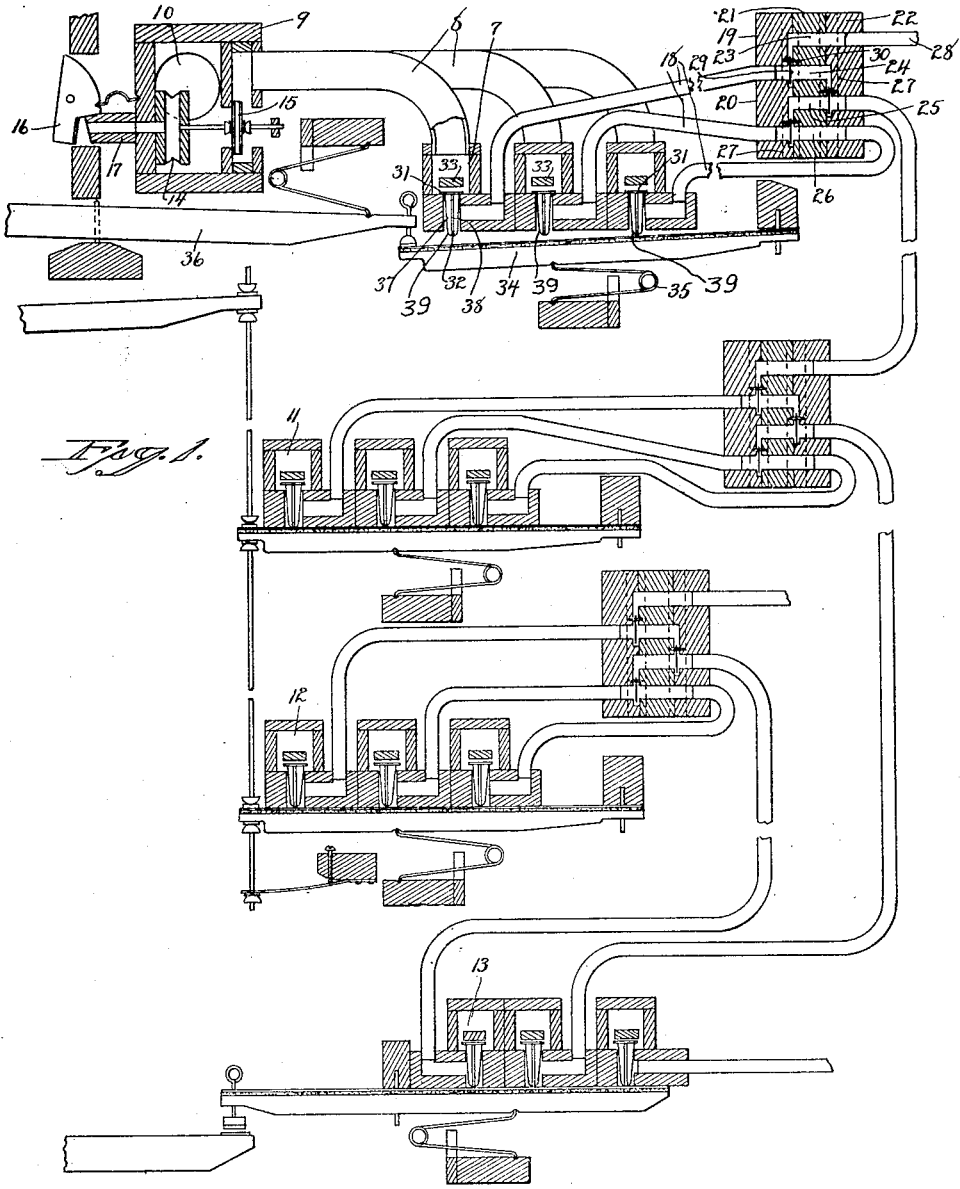

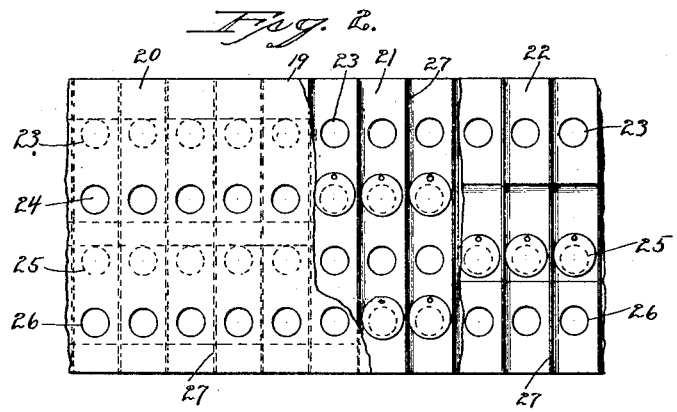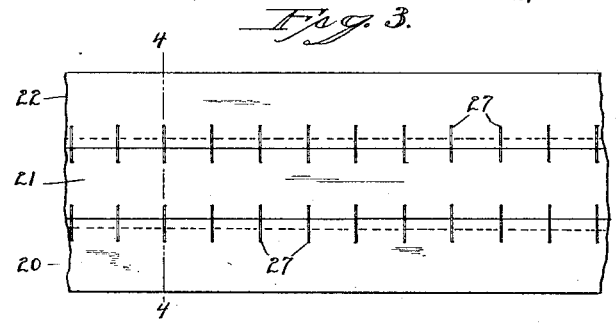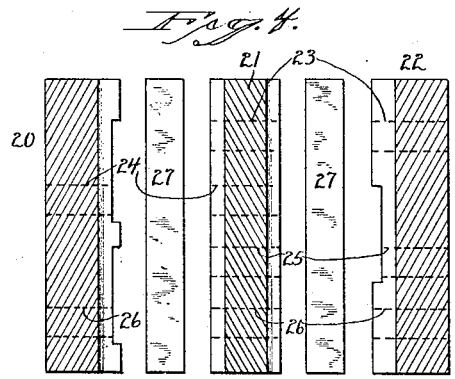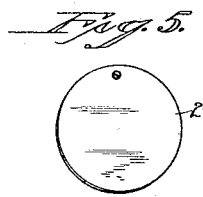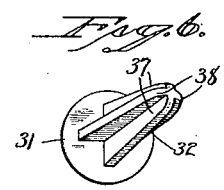

NICHOLAS SOLHEM, OF WATERBURY, CONNECTICUT.

ORGAN-ACTION.

1,283,582.  Specification of Letters Patent.  Patented Nov. 5, 1918.

Application filed July 20, 1917. Serial No. 181,690.

*To all whom it may concern:*

Be it known that I, NICHOLAS SOLHEM, a citizen of the United States, residing at Waterbury, in the county of New Haven and State of Connecticut, have invented a new and useful Improvement in Organ-Actions; and I do hereby declare the following, when taken in connection with the accompanying drawings and the characters of reference marked thereon, to be a full, clear, and exact description of the same, and which said drawings constitute part of this application, and represent, in—

Figure 1 a diagrammatic view partly in section illustrating an organ action constructed in accordance with my invention.

Fig. 2 a broken face view of a portion of a coupler-block embodying my invention.

Fig. 3 a top or plan view of the same.

Fig. 4 a sectional view on the line 4—4 of Fig. 3 with the parts separated.

Fig. 5 a perspective view of one of the coupler-block valves, detached.

Fig. 6 a perspective view of one of the air-chamber valves, detached.

This invention relates to an improvement in organ actions with particular reference to actions of the tubular pneumatic type.

The object of this invention is to produce an action simple in construction and operation, and reliable in action; and the invention consists in a novel form of valves for the air chambers controlling tubes to the chest action; a particular form of valve for the said coupler-blocks; and in particular details of construction as will be hereinafter described and particularly recited in the claims.

In carrying out my invention I employ a coupling-chamber 7 herein shown as comprising three units each of which is connected by a tube 8 with a coupler air-box 9 provided with an inlet 10 from the source of air supply. Similar air chambers 11, 12 and 13 are arranged for the great organ and pedals like the coupling-chamber 7 for the swell action. In the coupler-air box 9 is a pneumatic 14 controlling a valve 15 which closes the passage to the tube 8 or opens the tube 8 to the atmosphere. This pneumatic 14 is controlled through a tilting tablet stop 16 which, when turned to close the mouth of a tube 17 from the pneumatic 14, will cause the valve 15 to move in the desired direction. The several sections of the coupling-chamber 7 are each connected by a tube 18 with a coupler-block 19, one tube leading to the natural, one to the sub-octave, and the other to the super-octave. This coupler-block is made up of three strips of wood 20, 21 and 22 secured together face to face and formed with passages 23, 24, 25 and 26, and these passages are divided by vertically arranged transverse strips 27 of metal which separate the passages so as to form a separate passage for each note, the passage 23 opening into a pipe 28 to the chest action, not shown. To close the passages 24, 25 and 26, I suspend in them metallic disk valves 29 upon horizontally arranged pins 30.

The ducts 39 from the coupling-chamber 7 to the coupler-block are of substantially uniform diameter and are controlled by valves 31 having vertically arranged valve stems 32 limited in their upward movement by stops 33 and raised by a coupler-valve lever 34 under the action of a spring 35 when the lever 34 is released by the key 36 of the swell action. The stems 32 of the valves 31 are in the form of crossed plates 37 and 38, so that while the valves are guided to their seats, they permit of the maximum opening of the ducts 39 to the atmosphere when the valves are in the closed position. If a particular stop is turned so as to cause the pneumatic 14 to be actuated, the valve 15 will be moved outward so as to allow air from the coupler-air blocks to pass through one of the pipes 8 to its particular section of the coupling chamber 7; then when a key is depressed, the corresponding coupler valve lever will be raised to close the outlet to the atmosphere and the valve stem above it will be raised so as to open the valve in that particular section and allow the compressed air to pass to the coupler-block and as the air passes through any particular tube it will move the disk valve 29 so as to direct the air to the pipe 28 to the chest action. As soon as the key is released the coupler valve lever is depressed so as to allow the valves above it to close and open the tubes to the coupler-block to the atmosphere, through the passage 39, allowing any air therein to escape.

It will be understood that one of the three units of the coupling chamber is the natural or direct action, another one of the units being the sub-coupler, and the other one the super-coupler.

The description of the swell action will be sufficient for a clear understanding of the action for the great organ and pedals. By using metal disks as valves in the coupler-block these valves are not affected by moisture, and hanging loosely on pins are quick in action and not liable to become deranged.

I claim:

1. In an organ action, a coupler block formed in three sections, the adjacent faces of the sections formed with vertical grooves, and division plates located in said grooves and forming a series of separate air passages.

2. In an organ action, a coupler block formed with a series of separated air passages, valves located in said passages, said valves each consisting of a disk of metal eccentrically perforated and hung upon a pin arranged at right angles to the plane of the disks.

3. In an organ action, a coupling chamber formed in its bottom wall with a duct of uniform diameter opening at one end into the chamber and at the other end to the atmosphere, a valve in said duct normally closing the inner end thereof, said valve provided with a stem freely movable in said duct, and a coupling lever operated by a key for raising the said valve and closing the outer end of said duct.

In testimony whereof, I have signed this specification in the presence of two subscribing witnesses.

N. SOLHEM.

Witnesses:
FREDERIC C. EARLE,
CLARA L. WEED.

Copies of this patent may be obtained for five cents each, by addressing the "Commissioner of Patents Washington, D. C."